Jan. 5, 1926. 1,568,075

M. B. LLOYD

METHOD OF PRODUCING WOVEN REED ARTICLES

Original Filed August 20, 1920 2 Sheets—Sheet 1

Inventor
Marshall B. Lloyd
by Arthur W. Nelson
Attorney

Jan. 5, 1926.　　　　　　　　　　　　　　　　　　1,568,075
M. B. LLOYD
METHOD OF PRODUCING WOVEN REED ARTICLES
Original Filed August 20, 1920　　2 Sheets-Sheet 2

Inventor
Marshall B. Lloyd
by Arthur M Nelson
Attorney

Patented Jan. 5, 1926.

1,568,075

UNITED STATES PATENT OFFICE.

MARSHALL B. LLOYD, OF MENOMINEE, MICHIGAN, ASSIGNOR TO HEYWOOD-WAKEFIELD COMPANY, OF BOSTON, MASSACHUSETTS, A CORPORATION OF MASSACHUSETTS.

METHOD OF PRODUCING WOVEN-REED ARTICLES.

Original application filed August 20, 1920, Serial No. 404,800. Divided and this application filed January 19, 1924. Serial No. 687,188.

*To all whom it may concern:*

Be it known that I, MARSHALL B. LLOYD, a citizen of the United States, and a resident of Menominee, county of Menominee, and State of Michigan, have invented certain new and useful Improvements in Methods of Producing Woven-Reed Articles, of which the following is a specification.

My invention relates generally to the production of articles embodying therein a reed-like fabric, at least in part, and my invention relates particularly to the production of reed articles having a frame.

This application is a division of a co-pending application, Serial Number 404,800, filed August 20, 1920, and which issued into U. S. Letters Patent No. 1,503,904 on Aug. 5, 1924. Heretofore in the production of reed articles, it has been customary to secure the stakes, forming one part of the fabric, in the frame at one end, leaving the other ends free, and then manually to weave the filler strands over and under the respective stakes by alternately passing the filler strand over one stake and under the next adjacent stake. This practice is relatively slow and laborious, and requires a considerable degree of skill on the part of the reed worker before rapid, satisfactory work can be accomplished.

It is an object of my invention to provide a method and means whereby reed fabric can be woven on the frame of the article in a rapid, durable and economic manner, and wherewith it shall be possible for unskilled workers to produce reed articles of durable character, of pleasing appearance, and with a rapidity heretofore attainable only after a long apprenticeship.

My invention consists generally in the steps, acts, and stated sequence thereof, and in the means for practicing the method, whereby the above named objects, together with others that will appear hereinafter, are attainable; and my invention will be more readily understood by reference to the accompanying drawings which illustrate what I consider, at the present time, to be the preferred embodiment thereof.

Figure 1:
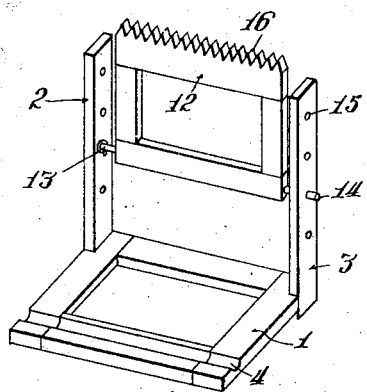
Fig. 1, is a perspective view of a device embodying my invention.

As a means of expediting the weaving operation, I prefer to provide a device in which the frame parts, on which the fabric is to be woven, can be properly held, and which shall be capable of co-acting in the weaving operation. To this end I provide a base frame 1 having spaced uprights or standards 2 and 3 at the rear thereof. The base 1 is preferably provided with a groove 4 for co-action with one of the frame parts of the article. Reed articles are generally provided with a dowel-like frame, i. e., a frame composed of wooden members circular in cross-section, and I have illustrated such a construction in the drawings, but this it should be understood is by way of illustration and not by way of limitation. For this reason the groove 4 is a curved groove and is adapted to receive one of the frame members such as 5.

Figure 8:
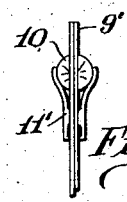
Fig. 8 is a view substantially on the line 8—8 of Fig. 6.
Figure 9:
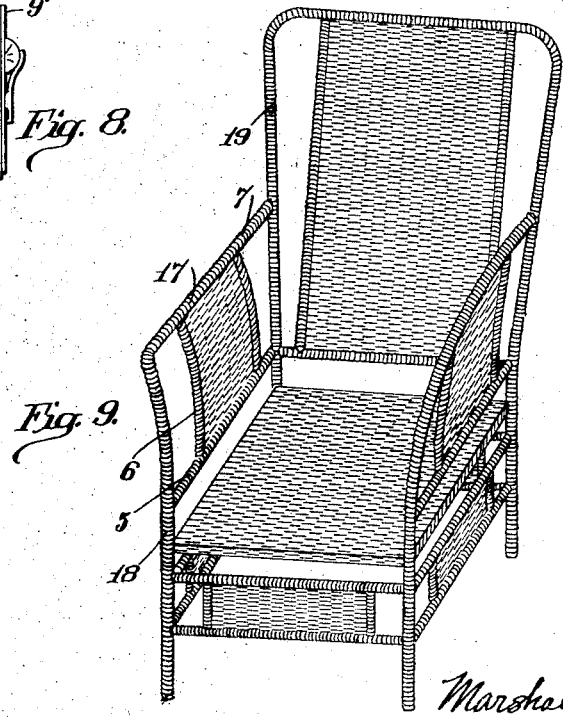
Fig. 9 is a perspective view of an arm chair produced by a method and means embodying my invention.

I have chosen to illustrate the formation of one of the side panels of the arm chair shown in Fig. 9, and hence have applied the reference character 5 to the dowel frame part which corresponds to the frame part 5 shown in conjunction with the weaving operation. Secured to and upstanding from the frame member 5 will be found two frame members 6 and 7, respectively, the corresponding members in Fig. 9 being given similar reference characters. The member 5 is preferably held in place in the weaving apparatus as by means of the detachable clamps 8. In the frame member 5 a plurality of spaced stake members 9 and 9' are secured, preferably by drilling holes in the member 5 and gluing the stake ends therein. These stakes may be composed of natural reed, of so-called fibre reed, or they may be composite stakes, as desired. Alternate stakes 9', as here shown, extend beyond the intermediate stakes 9 and they are secured temporarily to or in a bar-like member 10. Any suitable temporary securing means may be provided and the means here shown are spring like clamp or clip members 11 which embrace both the bar 10 and the stakes. The bar 10, as is probably best shown in Fig. 8, is also drilled to permit placement of the stakes therethrough. The bar 10 may, if desired, be one of the frame members of the article, but, as here shown, is a temporary bar which is simply used for the weaving operation. I shall now describe the weaving of the fabric.

Figure 2:
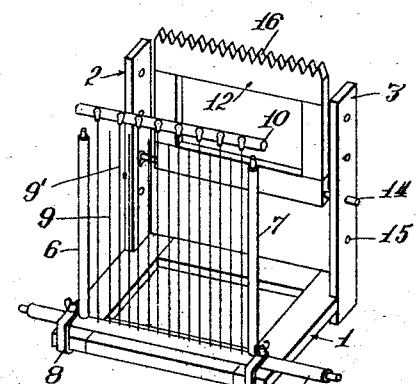
Fig. 2, is a view similar to Fig. 1, but illustrating an article in the first steps of being woven thereon.
Figure 3:
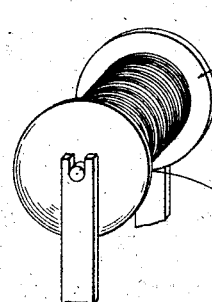
Fig. 3 is a somewhat diagrammatic view illustrating part of the article completed.
Figure 3:
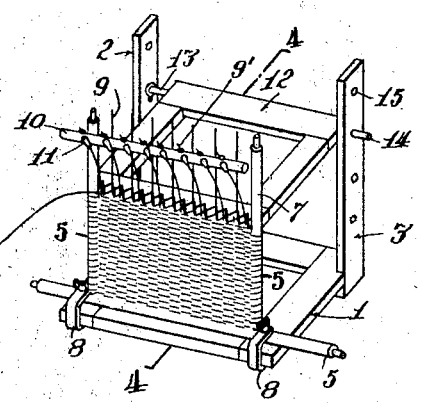
Figure 4:
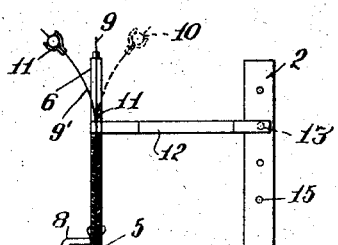
Fig. 4 is a sectional view substantially on the line 4—4 of Fig. 2.
Figure 5:
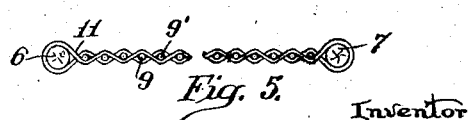
Fig. 5 is a sectional view substantially on the line 5—5 of Fig. 3.

Assuming the parts to be as shown in Fig. 2 the bar 10 is swung to one side of its normal vertical position. This forms a shed in which the filler strand can be placed very quickly as it may be placed along a straight line. So soon as a filler strand is placed therein the bar 10 is moved to the opposite side of its normal vertical position thus forming another shed in which the filler strand is likewise placed. The filler strand 11 may, if desired, be withdrawn from a spool or drum 12, as shown in Fig. 3, and is preferably passed around the outer sides of the standards 6 and 7 each time there is a reverse movement imparted to the bar 10 and the stakes secured thereto.

I have also provided means for packing the filler strands after they are laid in place which means here takes the form of a frame 12 which has end trunnion members 13 and 14 for co-action with bearings or holes provided in the standards 2 and 3. A plurality of bearings or holes 15 are provided at different heights, in the members 2 and 3, so that the member 12 can be raised, if desired, as the weaving of the fabric progresses. The frame member 12 is provided along one edge with a plurality of serrations or teeth 16 which are spaced in accordance with the spacing of the stakes 9 and 9'. Thus as shown in Fig. 3 when the frame 12 is swung downwardly the serrations or teeth portions 16 extend in the spaces between the stakes and hence engage the filler strands when the frame is pushed downwardly thereby quickly and properly packing the filler strands.

Figure 6:
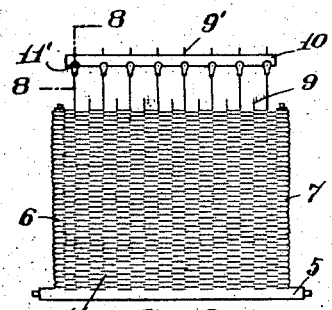
Fig. 6, is a view of the fabric completed and removed from the weaving apparatus.
Figure 7:
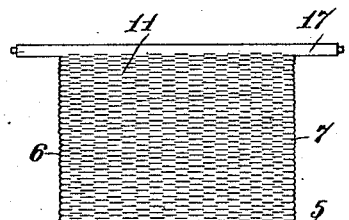
Fig. 7 illustrates the completed fabric associated with frame members binding all sides.

In this manner even an unskilled worker can very rapidly produce the finest character of woven fabric as a part of the article frame. When the fabric has been woven to the desired height, for example, as shown in Fig. 6, if the bar 10 is the temporary one spoken of, it and the temporary fastening devices 11 are removed from the stakes and thereafter, as shown in Fig. 7, a frame member 17 is attached to the uprights 6 and 7 and the various stakes 9 and 9' secured thereto in any suitable manner.

The frame member 17 is here shown as of greater length than the frame member 5 because it is the upper frame member of the chair side and is necessarily of greater length in order that it may extend between the front chair frame member 18 and the rearwardly inclined back frame member 19. Frame members 5 and 17 may be secured to the other chair members 18 and 19 in any suitable manner. It will be understood from the foregoing that other parts of the chair shown in Fig. 9 may be produced in the same manner and, when the parts are secured together there is obtained a reed article in which the reed fabric is woven around the frame members and hence is inseparably secured thereto.

The many advantages of the method and means herein shown and described will be apparent to those skilled in this art without further comment.

I claim:

1. The method of producing reed articles that consists in securing a plurality of spaced frame members, at one end, to a common frame member, securing a plurality of stakes at one end to said common frame member within the confines of said spaced frame members, securing certain of the stakes at the other end detachably to a temporary member free to move relative to the frame members, moving said member, with the stakes secured thereto, to one side of the normal plane of the stakes thereby forming a shed, placing a filler strand in said shed, moving said member and attached stakes to the other side of the normal plane of the stakes, thereby forming another shed, laying a filler strand in said shed, meanwhile passing the filler strand around one of the spaced frame members each time a shed is formed, and finally removing said stakes from said temporary member and securing them permanently to a frame member.

2. The method of producing articles having a stake and strand fabric of reed and the like that consists in providing an article frame, in securing a plurality of stakes at one end to the article frame, in causing a simultaneous movement of the free ends of desired stakes with respect to the free ends of the other stakes away from the normal plane of said stakes to provide an open ended shed, and inserting a filler strand into said shed and training portions thereof about parts of said article frame to form a woven fabric on said article frame.

3. The method of producing articles having a stake and strand fabric of reed and the like that consists in providing an article frame having spaced and substantially parallel members and a third member to which one end of each of the other members is secured, in securing a plurality of spaced stakes at one end to said third member of said article frame so that said stakes are normally arranged in the plane of the other frame members, in causing a simultaneous movement of the free ends of desired stakes away from said normal plane to provide an open ended shed and laying a length of an elongated filler strand into said shed and training portions about said spaced parallel frame members to form a woven fabric upon said frame.

4. The method of producing articles having a stake and strand fabric of reed or the like that consists in providing a U-shaped article frame having a bottom member and two side members, in securing a plurality of stakes at one end to said bottom member so that said stakes normally stand in the plane of the frame between said side members, in providing an instrumentality capable of being detachably secured to the free ends of desired stakes, so that said free ends of the desired stakes may be flexed from the plane of the frame and said other stakes to provide a shed, and in laying a length of an elongated filler strand into said shed and training portions of said filler strand about said side members to form a woven fabric upon said frame.

5. The method of producing articles having a stake and strand fabric of reed or the like that consists in providing a U-shaped article frame having a bottom member and two side members, in securing a plurality of stakes at one end to said bottom member so that said stakes normally stand in the plane of the frame between said side members, in providing an instrumentality capable of being detachably secured to the free ends of desired stakes, so that said free ends of the desired stakes may be flexed from the plane of the frame and said other stakes to provide a shed, in laying a length of an elongated filler strand into said shed and training portions of said filler strand about said side members to form a woven fabric upon said frame, and in mechanically packing the successive courses of filler strand into proper relation with respect to the filler strands of the preformed fabric.

In testimony whereof, I have hereunto set my hand this 16th day of January, 1924.

MARSHALL B. LLOYD.